(12) United States Patent
Schliesch

(10) Patent No.: US 10,527,455 B2
(45) Date of Patent: Jan. 7, 2020

(54) HALL SENSOR

(71) Applicant: MAX BAERMANN GMBH, Bergisch Gladbach (DE)

(72) Inventor: Thomas Schliesch, Kürten (DE)

(73) Assignee: MAX BAERMANN GMBH, Bergisch Gladbach (DE)

( * ) Notice: Subject to any disclaimer, the term of this patent is extended or adjusted under 35 U.S.C. 154(b) by 0 days.

(21) Appl. No.: 15/565,975

(22) PCT Filed: Apr. 15, 2016

(86) PCT No.: PCT/EP2016/058310
§ 371 (c)(1),
(2) Date: Oct. 12, 2017

(87) PCT Pub. No.: WO2016/166265
PCT Pub. Date: Oct. 20, 2016

(65) Prior Publication Data
US 2018/0106642 A1 Apr. 19, 2018

(30) Foreign Application Priority Data
Apr. 16, 2015 (DE) .......... 10 2015 105 854

(51) Int. Cl.
*G01D 5/14* (2006.01)
*H02K 11/215* (2016.01)
(52) U.S. Cl.
CPC .......... *G01D 5/145* (2013.01); *H02K 11/215* (2016.01)
(58) Field of Classification Search
CPC .. G01D 5/145; H02K 11/215; H02K 2213/12; G01R 31/346; G01R 31/343
(Continued)

(56) References Cited

U.S. PATENT DOCUMENTS

| 2011/0068780 | A1 | 3/2011 | Sakai | |
| 2015/0022191 | A1* | 1/2015 | Ausserlechner | G01R 33/02 324/207.21 |

(Continued)

FOREIGN PATENT DOCUMENTS

| DE | 112007003276 T5 | 2/2010 |
| DE | 102013205313 A1 | 10/2014 |

(Continued)

OTHER PUBLICATIONS

Int'l Search Report and Written Opinion dated Jun. 20, 2016 in Int'l Application No. PCT/EP2016/058310.

(Continued)

*Primary Examiner* — Melissa J Koval
*Assistant Examiner* — Trung Nguyen
(74) *Attorney, Agent, or Firm* — Panitch Schwarze Belisario & Nadel LLP

(57) ABSTRACT

A sensor assembly is provided for determining an angular position of a rotor in relation to a stator, including two components, a magnet and a sensor, where the components are arranged in such a way that the components can be rotated in relation to each other about an axis of rotation, and the sensor includes a first and a second sensor pair, each having a first and a second sensor element. A straight line is associated with each sensor pair, along which straight line the two sensor elements lie and which straight line intersects with the axis of rotation, where the first sensor element has a smaller distance from the axis of rotation than the second sensor element, and the straight line associated with the first sensor pair is spaced apart from the straight line associated with the second sensor pair by a rotational angle about the axis of rotation.

13 Claims, 4 Drawing Sheets

(58) Field of Classification Search
USPC ...... 324/207.11–207.25, 200, 233, 600, 617,
324/622, 631, 500, 521, 683, 709, 66,
324/76.11, 76.52–76.77, 86, 107
See application file for complete search history.

(56) References Cited

U.S. PATENT DOCUMENTS

2015/0022192 A1    1/2015  Ausserlechner
2015/0226581 A1*  8/2015  Schott .................... G01D 5/145
                                                  324/207.2

FOREIGN PATENT DOCUMENTS

| EP | 1967824 | A1 | 9/2008 |
| EP | 2077438 | A1 | 7/2009 |
| EP | 2846136 | A1 | 3/2015 |
| WO | 2014029885 | A1 | 2/2014 |

OTHER PUBLICATIONS

Search Report dated Jan. 21, 2016 in DE Application No. 102015105854.5.

* cited by examiner

HALL SENSOR

CROSS-REFERENCE TO RELATED APPLICATIONS

This application is a Section 371 of International Application No. PCT/EP2016/058310, filed Apr. 15, 2016, which was published in the German language on Oct. 20, 2016 under International Publication No. WO 2016/166265 A1, and the disclosure of which is incorporated herein by reference.

BACKGROUND OF THE INVENTION

The invention relates to a sensor assembly for determining an angular position of a rotor relative to a stator according to the preamble of claim 1, and also relates to a method for determining an angular position of a rotor relative to a stator using a sensor assembly.

Generic sensor assemblies are used to determine the angular position of a rotor relative to a stator in a non-contact manner. Generally, the rotor and the stator are components which are rotatable relative to each other about an axis of rotation. For example, the rotor may be a shaft and the stator may be a bearing housing. For example, the rotor may be adapted to rotate about the axis of rotation while the stator is stationary, so that the rotor can rotate about the axis of rotation relative to the stator. For example, both the stator and the rotor may be adapted to rotate about the same axis of rotation, and the rotor may be rotatable relative to the stator about the axis of rotation. The angular position of the rotor relative to the stator is defined by an angle about which the rotor is rotated about the axis of rotation relative to the stator. Thus, generic sensor assemblies are configured so that first an initial angular position of the rotor relative to the stator can be determined, and then the angle at which the rotor is located relative to the stator can be continuously detected starting from the initial angular position, and the angle can be indicated unambiguously between 0 and $2\pi$.

Generic sensor assemblies have two components, namely a magnet and a sensor, where one of the components can be arranged and fixed on the rotor and the other one on the stator, for non-contact detection of the angular position of the rotor relative to the stator. The magnet is configured and arranged relative to the sensor in such a way that it generates a magnetic field at the sensor, which field varies as a function of the angle defining the angular position about the axis of rotation, and is distributed periodically with a period length of $2\pi$ or an integer fraction of $2\pi$. For an unambiguous determination of the angular position, the sensor usually has a plurality of sensor elements, each of which is configured to determine the magnetic field strength to which it is exposed, and the exact angular position is obtained by comparison measurements of the different sensor elements of the sensor. In this case, the sensor elements of the sensor are arranged at different positions relative to the magnet, so that they each measure a different magnetic field strength in dependence of the position of the magnet, i.e. its angle about the axis of rotation, so that a comparison measurement, i.e. a comparison of the different measured values derived from different sensor elements, theoretically allows for a particularly precise determination of the angular position using the sensor assembly.

Various implementations of the magnet and the sensor of generic sensor assemblies are known from the prior art. For example, multi-pole ring magnets are usually used as the magnets (see e.g. the sensor assemblies of WO 2014/029885 A1 or DE 11 2007 003 276 T5), since such magnets are capable of providing, in a simple manner, a magnetic field with a magnetic field strength that varies periodically, with short period lengths, as a function of the angle about the axis of rotation. This is particularly advantageous for a most precise possible determination of the angle, and thus, when used on the rotor and stator, of the angular position of the rotor relative to the stator. In conventional sensor assemblies, the magnet is usually arranged on the end face of the rotor, that is on a face of the rotor through which the axis of rotation extends, and the sensor is arranged along the axis of rotation slightly spaced apart from the magnet and the end face of the rotor, so that the sensor is capable of detecting particularly well the magnetic field and accordingly also the variation of the magnetic field as a function of the angle of the magnet about the axis of rotation. However, a fundamental problem of conventional sensor assemblies is that at the locations of application of the sensor assemblies, the presence of external magnetic fields (interfering magnetic fields) cannot be excluded, so that the determination of the angular position by comparison measurements using a plurality of sensor elements is often incorrect, since the external magnetic field has different external magnetic field strengths at different sensor elements, so that the different measured values of the magnetic field strength derived from different sensor elements are not only caused by the position of the magnet of the sensor assembly relative to the respective sensor element but also by the external magnetic field.

In the sensor assembly according to WO 2014/029885 A1, this problem is addressed by having the sensor of the sensor assembly arranged along the axis of rotation facing a magnet in the form of a multi-pole ring magnet and within the radial extent of this magnet, characterized in that the sensor has two sensor pairs each comprising two sensor elements, all the sensor elements are arranged on a circle about the axis of rotation within the radial extent of the ring magnet, and the sensor elements of a sensor pair are arranged diametrically opposite to each other relative to the axis of rotation and symmetrically to the axis. All the sensor elements are adapted to determine the field component of the magnetic field provided by the magnet along the axis of rotation, and the sensor elements of a sensor pair that are arranged opposite to each other are arranged in opposite orientations to each other. By summing the measured values of the sensor elements of a sensor pair it is therefore possible to average out an external magnetic field under the assumption that the external magnetic field is the same on the two sensor elements. The prerequisite for an error-free functionality of the described sensor assembly is always that the sensor elements of a sensor pair are arranged as close to each other as possible and within the radial extent of the ring magnet, since only in this case it is possible to reliably average out an external magnetic field by summation of the measured values of the sensor elements of the sensor pair, while at the same time determining the angle of the magnet about the axis of rotation without error, because of the angle-dependence of the magnetic field which is given in this case. The sensor elements can then be arranged within a radial range around the axis of rotation in which the magnetic field strength changes monotonously along the axis of rotation, so that a reliable determination of the angle of the magnet about the axis of rotation is enabled even in case of a slight shift in location of the sensor relative to the magnet. Hence, a particular drawback of the described sensor assemblies is that the sensor assemblies necessarily have to be arranged on the end face of a rotor, so that an error-free determination of the angular position can be accomplished. It is not possible, for example, to arrange the sensor assembly at a large radial distance from the axis of rotation, for example on the radially outer surface of a rotor.

BRIEF SUMMARY OF THE INVENTION

The present invention is based on the object of providing a sensor assembly which can be employed for most versatile applications and is suitable for a most precise determination possible of the angular position of a rotor relative to a stator, and which in particular remedies at least one of the disadvantages of prior art sensor assemblies mentioned above. The invention is furthermore based on the object of providing a method for determining the angular position of a rotor relative to a stator using a sensor assembly which can be performed the most easily and precisely possible, and which in particular remedies at least one of the aforementioned disadvantages of prior art methods.

As a solution to the technical problem mentioned, the invention proposes a sensor assembly with the features according to claim 1. The sensor assembly comprises two components, namely a magnet and a sensor. The components are arranged for rotation relative to each other about an axis of rotation. For example, the sensor may be spaced apart from the magnet along the axis of rotation, for example by a few millimeters. The sensor comprises a first and a second sensor pair, the first and second sensor pairs each having a first and a second sensor element. Each sensor element is configured to determine a magnetic field strength of a magnetic field that is prevailing at the location where the sensor element is arranged. According to the invention, each sensor pair has associated therewith a straight line along which the two sensor elements lie and which intersects the axis of rotation. Each of the sensor elements is thus adapted to determine the magnetic field strength of a magnetic field within a spatial range with a spatial center that lies essentially on the straight line. At least one, in particular all of the straight lines associated with the sensor pairs may extend perpendicular to the axis of rotation. Most preferably, all the straight lines have the same angle relative to the axis of rotation. According to the invention, the first sensor element has a smaller radial distance from the axis of rotation than the second sensor element. This may in particular apply to each sensor pair. Radial distance refers to the distance along a direction which is perpendicular to the axis of rotation and extends through the axis of rotation and through the respective sensor element. In particular, for at least one, in particular for each of the sensor pairs, both sensor elements are located on the same radial side of the axis of rotation. The straight line associated with the first sensor pair is spaced apart from the straight line associated with the second sensor pair by a rotational angle about the axis of rotation. The straight lines are arranged relative to each other in particular in a manner so that in case of an imaginary rotation of the straight line associated with the first sensor pair about the rotational angle around the axis of rotation, the straight line associated with the first sensor pair would coincide with the straight line associated with the second sensor pair.

The sensor assembly according to the invention can be used for a great variety of applications and is suitable for a particularly precise determination of the angular position of a rotor relative to a stator. Due to the arrangement of two sensor pairs spaced apart from each other by an angle of rotation it is basically possible to particularly precisely detect the angular position or the angle of the magnet about the axis of rotation. Since each sensor pair includes two sensor elements that lie on a straight line which extends through the axis of rotation and each have a different distance from the axis of rotation, it is moreover possible to determine, for each sensor pair, a value for the magnetic field generated by the magnet without the influence of an external magnetic field, so that the angle of the straight line associated with the sensor pair can be determined most precisely. This results from the following consideration: The magnetic field that is provided by a magnet can be calculated precisely, in particular it is possible to calculate the distribution of the magnetic field strength which is a function of the radial distance from the axis of rotation. For example, the magnetic field provided by some known multi-pole ring magnets, in particular by ring magnets with axial-lateral magnetization, is distinguished by the fact that the value of the radial magnetic field component thereof increases at least approximately linearly within a section of the radius. Other magnets with other radial dependencies of the magnetic field are also known. Since the radial dependency of the value of a magnetic field component is known, the influence of an external magnetic field can be eliminated, for example by calculating the difference between the values obtained from the sensor elements of a sensor pair. Here, the sensor elements can be arranged on the same radial side of the axis of rotation and so close to each other that the external magnetic field will in fact be the same on both sensor elements, with a good approximation. A corresponding elimination of the external magnetic field can be made for each sensor pair. Then, the angle of the magnet about the axis of rotation and thus the angular position of a rotor relative to a stator about the axis of rotation can be determined very precisely by a comparison of the values obtained for each sensor pair. What in particular contributes to the versatile applicability of the sensor assembly according to the invention is the fact that the sensor assembly of the invention permits to use magnets with different geometries and that magnets can be attached to the rotor or stator at different points, for example at the end face of a rotor or on the radially outer surface of a rotor, and the arrangement of the sensor elements can be chosen depending on the chosen arrangement and configuration of the magnet. Since the sensor elements of a sensor pair can be arranged on the same radial side of the axis of rotation and an appropriate spacing between the sensor elements can be chosen freely, the sensor assembly of the invention is thus not limited to specific designs but can be easily adapted for various designs, in particular for an arrangement of a magnet on an end face or for an arrangement of a magnet on a radially outer surface. Therefore, the sensor assembly of the invention differs from prior art sensor assemblies. Known sensor assemblies such as the sensor assembly according to WO 2014/029885 A1, for example, are configured so that the sensor elements of the sensor assembly are arranged radially on the axis of rotation of the rotor or at least at a very small radial distance from the axis of rotation. Usually, the sensor elements are spaced apart radially from the axis of rotation by less than 5 mm, mostly by less than 2 mm, and usually a magnet with a diameter of between 10 and 20 mm around the axis of rotation is provided so that the magnet is capable of providing a sufficiently large magnetic field at the location of the sensor elements, which location is at least in the vicinity of the axis of rotation. For this reason, known sensor assemblies are usually also referred to as "on-axis" arrangements, which are arranged on an end face side of the rotor, i.e. in the direction of the rotation axis adjacent to the rotor and thus in a length section along the axis of rotation which is outside the extension range of the rotor along the axis of rotation. The sensor assembly of the invention, by contrast, provides embodiments which can be used as a so-called "off-axis" arrangement. Since the two sensor elements can be arranged radially on the same side of the axis of rotation, the sensor elements can both be spaced apart from the axis of rotation by more than 10 mm, in particular by more than 15 mm, for example between 15 mm and 30 mm. Accordingly, a magnet with a diameter of more than 20 mm, in particular of more than 30 mm, in particular of between 30 mm and 50 mm, can be used. The sensor assembly of the invention is therefore particularly suitable for applications in which the sensor including the sensor elements is arranged laterally to the rotor or laterally to the stator, that is to say at any desired position along the axis of rotation. Thus, the sensor does not necessarily need to be arranged on the end face of the rotor but can be arranged laterally to the rotor. For example, the sensor with the sensor elements can be arranged radially offset relative to the rotor in a length section along the axis of rotation in which the rotor extends along the axis of rotation. At least in some embodiments within the scope of the invention, the sensor may be very small at the same time. Thus, in the case of embodiments of such configuration the sensor assembly can be arranged on the rotor or stator in a space-saving manner on the one hand, and on the other hand the manufacturing costs and material costs for producing the sensor assembly can be kept low. This is due to the fact that each of the sensor elements of a sensor pair can be arranged on a radial side of the axis of rotation and thus laterally to the rotor, so that no device extending around the axis of rotation is required for implementing the sensor of the sensor assembly. In particular, all the sensor pairs can be configured so that the sensor elements thereof are arranged on a radial side of the axis of rotation. Moreover, the rotational angle between the straight lines of two adjacent sensor pairs can be kept very low, which further contributes to a space-saving and material-saving design of the sensor assembly. Particularly advantageously, an N-pole magnet is provided as the magnet. According to the invention, a magnet with at least two, in particular with more than two poles can be provided, in particular with an even number of poles. The greater the number of poles, the smaller the rotational angle can be chosen. What is always essential here is that the two adjacent sensor pairs lie on straight lines that are spaced apart by such a rotational angle that they will measure different phases of the magnetic field that is generated by the magnet. In case an N-pole magnet is provided, it is particularly preferably suggested that the rotational angle about which the straight lines of two adjacent sensor pairs are spaced apart from each other is less than $$\frac{2\pi}{N}.$$

Particularly preferably, this rotational angle is $$\frac{\pi}{N}.$$

In this case, the calculation of the rotational angle can be particularly simple, as will be apparent from the exemplary calculation further below, in particular in the case of a magnetic field with a magnetic field strength exhibiting a periodic distribution that is a function of a rotational angle about the axis of rotation with a period length τ, due to the respective phase shift of the magnetic field measured by the two sensor pairs as a result of the rotational angle.

Particularly preferably, the radial distance between the two sensor elements of the first sensor pair corresponds to the radial distance between the two sensor elements of the second sensor pair from each other. This enables a precise determination of the angle of the magnet relative to the sensor with respect to a rotation about the axis of rotation in a particularly simple manner by a comparison of the values which are analytically determined at the two sensor pairs from the sensor elements of the sensor pairs. This is because due to the identical spacing of the sensor elements, direct comparability can be achieved of the values of the sensor pairs determined from the sensor elements of the sensor pairs, without complicated analytic re-calculations taking into account the magnetic field distribution of the magnetic field generated by the magnets. Particularly preferably, the first sensor element of the first sensor pair has the same radial distance from the axis of rotation as the first sensor element of the second sensor pair. Particularly preferably, the second sensor element of the first sensor pair has the same radial distance from the axis of rotation as the second sensor element of the second sensor pair. With these measures, in particular a combination of the measures, a particularly good comparability of the values can be provided without the need for analytical re-processing of the values that are determined for each sensor pair from the sensor elements of the sensor pair.

In one embodiment, the magnet is embodied as a multi-pole magnet with at least two, in particular at least four poles for providing a magnetic field with a magnetic field strength that is distributed periodically about the axis of rotation as a function of a rotational angle, with a period length τ. The period length τ may in particular be constant over the entire angular range from 0 to 2π, and may in particular be $$\frac{4\pi}{N},$$

with N indicating the number of poles of the magnet. The magnet may in particular be provided in the form of a ring magnet. For example, the magnet may have a plurality of poles on an end face thereof which defines an end of the magnet along the axis of rotation. For example, the magnet may be configured as a ring magnet with ring sections on an end face thereof each forming a pole, wherein in particular each ring section extends over an angular section of the same size. For example, the magnet may be a four-pole ring magnet, with each pole extending over an angular section of 90°. The magnet may be axially magnetized, for example, so that the magnetization vectors within the magnet extend substantially completely along the axis of rotation. The magnet may be a multi-pole magnet with axial-lateral magnetization, for example, so that the magnetization within the magnet extends partly with a component along the axis of rotation and partly with a component perpendicular to the axis of rotation. For example, a multi-pole magnet with axial-lateral magnetization may be designed so that each of the different poles thereof is defined by a magnetic section, and with the direction of the magnetization vector varying within a magnetic section that defines a pole. In this case, such a magnet with axial-lateral magnetization may be in the form of a ring magnet, for example, in which each magnetic section is in the form of an angular section, and in particular wherein within a magnetic section defining a pole the direction of the magnetization vector is constant along a radial axis within the entire magnetic section. For example, a magnet with axial-lateral magnetization may be configured so that the magnetization within the magnet extends in an arc-shaped manner, in particular in the form of a circular arc, in particular about an axis perpendicular to the axis of rotation as the center of the arc. In this case, for example, the magnetization vector may extend perpendicular to the axis of rotation at the transition between two poles that are arranged adjacent to each other, while with increasing distance from the transition the component of the magnetization vector towards the axis of rotation will increase in each section. In particular, such a magnet with axial-lateral magnetization may be in the form of a ring magnet in which each pole is defined by an angular section of the magnet around the axis of rotation and the poles are adjacent to each other. In the described embodiment in which a multi-pole magnet is employed it is essential that the magnet is configured so as to provide a magnetic field with a magnetic field strength that is distributed periodically about the axis of rotation as a function of a rotational angle, with a period length τ. For this purpose, alternatingly arranged poles are provided along the course of the rotational angle. Period length τ decreases with increasing number of poles. Particularly preferably, the number of poles is a multiple of 2. The periodicity may in particular relate to a specific component of the magnetic field, for example to the radial component of the magnetic field. By providing such a multi-pole magnet which provides such a periodically distributed magnetic field it is possible to ensure a particularly reproducible measurement of the angle of the magnet relative to the sensor and thus a particularly precise determination of the angular position of a rotor relative to a stator using the sensor assembly of the invention.

Particularly preferably, the rotational angle about which the straight lines of the two sensor pairs are spaced apart from each other is $$\frac{\pi}{N},$$

wherein N indicates the number of poles of the magnet. In this way, a determination of the angle of the magnet relative to the sensor can be particularly simplified because, as will be apparent from the exemplary calculation given below, a phase shift between the sensor pairs with respect to the periodic distribution of the magnetic field strength can be given by a respective rotational angle, which makes possible a simple analytical calculation of the angle based on a comparison, in particular on the basis of calculating a ratio of the values obtained from the sensor pairs.

Particularly preferably, the magnet is configured such that a magnetic field component of a specific direction, for example the magnetic field component in a direction perpendicular to the axis of rotation, for example the magnetic field component in the radial direction, of a magnetic field generated by the magnet changes monotonically, in particular linearly, within a section of the radius as a function of the radius, and the sensor elements of the sensor are arranged within this radius section. Particularly preferably, for this purpose, the magnet may be in the form of a ring magnet with axial-lateral magnetization. Particularly preferably, the dependency, that is the change of the particular magnetic field component with the radius, i.e. with the radial distance from the axis of rotation, is identical over the entire angular range from 0 to 2π, so that the radius section is also identical for any rotational angle about the axis of rotation. With such a configuration of the magnet, a particularly good comparison measurement between the sensor pairs can be made possible, and thus a particularly simple and precise determination of the angle of the magnet relative to the sensor. In this embodiment it may be particularly advantageous to arrange the sensor elements of at least one sensor pair, in particular of all sensor pairs, within this radius section in which the determined magnetic field component changes monotonically, in particular linearly. In order to avoid incorrect measurements due to positional tolerances between the magnet and the sensor, such as tolerances in the radial distance, it may be particularly advantageous in this exemplary embodiment if the radial distance between the sensor elements of a sensor pair is less than 90%, in particular less than 70%, of the radial extent of the radius section. In this way, the determination of the angle of the magnet relative to the sensor can be particularly simplified, as will be explained in further detail below by way of an exemplary calculation.

In one embodiment, at least one of the sensor pairs comprises at least three sensor elements each of which is located along the straight line associated with the sensor pair. In one embodiment, the sensor comprises at least three sensor pairs, each one having a respective straight line associated therewith along which the sensor elements of the respective sensor pair are arranged, and all the straight lines are spaced apart by a rotational angle about the axis of rotation and intersect in the axis of rotation. In this case, in particular the same rotational angle may always be provided between two adjacent straight lines, of course with respect to a specific direction of rotation about the axis of rotation. In the described embodiments, the provision of a large number of sensor elements can allow for a particularly precise determination of the angle of the magnet relative to the sensor, and thus a particularly precise determination of an angular position of a rotor relative to a stator by the sensor assembly according to the invention, since the multitude of different sensor elements allows for various comparison measurements, so that errors caused by a malfunction or erroneous arrangement of individual sensor elements or errors caused by undesirable variations within the magnet, such as magnetization variations, can be best eliminated.

In one embodiment, all the sensor elements are configured so as to output a measured value which is proportional to the magnetic field prevailing at the location at which they are arranged. The location where a sensor is located is defined by the center of the space in which the sensor measures a magnetic field. In one embodiment, all the sensor elements are configured so as to measure a magnetic field component in exactly one direction and therefore to output a measured value which is proportional to the magnetic field component in this direction. For example, all the sensor elements may be configured as Hall sensor elements, so that they will output a Hall voltage as the measured value. In this case, the outputted Hall voltage may be predefined as $U_{HALL}=k*B_r$, wherein $U_{HALL}$ is the Hall voltage outputted by a Hall sensor element as the measured value, k denotes a proportionality factor, and $B_r$ a radial field component. The sensor elements may in particular be configured so as to be able to measure exclusively a magnetic field component with an orientation perpendicular to the axis of rotation, in particular exclusively a magnetic field component in the radial direction. Such a configuration of the sensor elements as Hall sensor elements can be particularly advantageous, since Hall sensor elements are producible in cost-efficient manner and are well suited for a precise determination of an applied magnetic field. Moreover, the limitation of the measurement to a magnetic field component in one predetermined direction reduces the error susceptibility of the sensor assembly.

In one embodiment, the sensor assembly includes a computing unit for determining the angular position, the computing unit being configured to determine, from the sensor elements, measured values which are proportional to a magnetic field prevailing at the respective sensor element, in particular proportional to a specific magnetic field component of the magnetic field, in particular proportional to a magnetic field component of the magnetic field perpendicular to the axis of rotation, in particular proportional to a radial field component of the magnetic field. The computing unit included in the sensor assembly allows to directly determine measured values from the sensor elements, so that the computing unit enables to directly obtain conclusions about the angular position of a rotor relative to a stator in case of the intended use of the sensor assembly according to the invention. Particularly preferably, the computing unit is configured to calculate a first differential value by subtracting a measured value as determined from the first sensor element of the first sensor pair from a measured value as determined from the second sensor element of the first sensor pair, and to calculate a second differential value by subtracting a measured value as determined from the first sensor element of the second sensor pair from a measured value as determined from the second sensor element of the second sensor pair, and to determine the angular position of the rotor relative to the stator from the ratio of these differential values. This in particular permits to eliminate an interfering influence of an external interfering magnetic field, which could otherwise cause errors in the determination of the angle-dependent magnetic field generated by the magnet of the assembly. The subtraction may be effected, for example, by computational subtraction of the measured values determined from two identically oriented Hall sensors, or by mathematical summation of the measured values determined from two oppositely oriented Hall sensors. In either case, the subtraction serves to eliminate an influence of an interference field. The determination of the angular position from the ratio of the differential values may be accomplished analytically or numerically in the computing unit, for example. In the described embodiment, the influence of an external magnetic field can be eliminated by calculating the difference of the measured values of the sensor elements of each sensor pair, whereas by calculating a ratio between the measured values that were determined for the sensor pairs, a direct determination of the angle of the magnet relative to the sensor can be made possible, for example, by equating the ratio of the differential values with the ratio of the functions expressed as a function of the angle, which mathematically represent the physically expected differential values. The physically expected differential values can be derived physically, mathematically from the known behavior of the sensor elements and the distribution of the magnetic field of the magnet. This will be explained in more detail below by way of an exemplary calculation.

Particularly preferably, the computing unit is configured to define the angular position by an angle $\alpha$ and to determine the angle $\alpha$ using the equation $$\frac{U_1}{U_2} = \frac{f\left(\frac{2\pi}{\tau} * \alpha\right)}{f\left(\frac{2\pi}{\tau} * (\alpha + \beta)\right)},$$

wherein $U_1$ is the first differential value, $U_2$ is the second differential value, $\tau$ is the period length, $f(\alpha)$ is a periodic function depending on $\alpha$ with the period length $\tau$, and $\beta$ is the rotational angle between the straight lines associated with the two sensor pairs. The differential values $U_1$ and $U_2$ can be derived from the measured values of the sensor elements of the two sensor pairs as explained above, whereas the functional representation of the ratio of the differential values as a function of the angle $\alpha$ which characterizes the angle of the magnet relative to the sensor, and as a function of the rotational angle $\beta$ between the straight lines of the sensor pairs and the period length $\tau$, which are given by the geometric configuration of the sensor assembly, reflects the physically-mathematically expected functionality of the differential values taking into account the periodic behavior of the magnetic field strength as a function of the angle $\alpha$. Particularly preferably, the magnet is configured and arranged relative to the sensor in such a way that it provides, at the location of the sensor elements, a magnetic field with a periodicity free of harmonics in the sense of a Fourier series development. This simplifies the periodic function $f(\alpha)$ so that the above equation can be simplified to give:

$$\frac{U_1}{U_2} = \frac{\sin\left(\frac{2\pi}{\tau} * \alpha\right)}{\sin\left(\frac{2\pi}{\tau} * (\alpha + \beta)\right)}.$$

Such a magnetic field can in particular be provided by a magnet with axial-lateral magnetization. As a result, the determination of a can be particularly simplified.

The invention furthermore relates to the use of a sensor assembly according to the invention for determining the angular position of the rotor relative to the stator, where measured values are derived from the sensor elements of the sensor pairs. A first differential value is calculated by subtracting a measured value as determined from the first sensor element of the first sensor pair from a measured value as determined from the second sensor element of the first sensor pair. A second differential value is calculated by subtracting a measured value as determined from the first sensor element of the second sensor pair from a measured value as determined from the second sensor element of the second sensor pair. The subtraction in particular permits to eliminate an interfering influence of an external interfering magnetic field which could otherwise cause errors in the determination of the angle-dependent magnetic field generated by the magnet of the assembly. The angular position is then determined from the ratio of the two differential values. The use according to the invention provides the advantages described above in conjunction with the sensor assembly of the invention and can be performed as explained above.

The invention furthermore relates to a method for determining an angular position of a rotor relative to a stator using a sensor assembly which comprises two components, namely a magnet and a sensor. One of the two components is arranged on the rotor and the other one is arranged on the stator. The sensor comprises a first and a second sensor pair, and each sensor pair comprises two respective sensor elements. The sensor pairs are spaced apart from each other by a rotational angle about an axis of rotation about which the rotor is rotatable relative to the stator. Measured values are determined from the sensor elements, each measured value being proportional to a magnetic field prevailing at the respective sensor element. A first differential value is calculated by subtracting a measured value as determined from the first sensor element of the first sensor pair from a measured value as determined from the second sensor element of the first sensor pair. A second differential value is calculated by subtracting a measured value as determined from the first sensor element of the second sensor pair from a measured value as determined from the second sensor element of the second sensor pair. The subtraction in particular permits to eliminate an interfering influence of an external interfering magnetic field which could otherwise cause errors in the determination of the angle-dependent magnetic field generated by the magnet of the assembly. The angular position is determined from the ratio of the two differential values, and for this purpose the embodiments described above can be applied accordingly. The method of the invention can imply advantages and can include further features which have been described above in detail in conjunction with the sensor assembly according to the invention.

The determination of the angular position may be accomplished according to the invention through the determination of the angle α at which the magnet is arranged relative to the sensor, for example as described below in the exemplary embodiment. Below, a periodic dependence of the magnetic field on the angle α without harmonics shall be assumed. The following calculations are, of course, also applicable to any other periodic function $f(\alpha)$. In this case, the function $\sin(\alpha)$ as used below for simplification, would have to be replaced by $f(\alpha)$. The exemplary embodiment described by way of example uses a sensor assembly which comprises two sensor pairs, each one having two sensor elements, each of which is configured as a Hall sensor element. The Hall sensor elements are adapted to measure a magnetic field component in a specific direction, in particular perpendicular to the axis of rotation, in particular a radial magnetic field component, by outputting, as the measured values, a Hall voltage U which is proportional to the determined magnetic field component of the magnetic field $\vec{B}$ to which the sensor elements are exposed. In the described embodiment, the sensor assembly according to the invention comprises a multi-pole magnet having a number N of poles and providing a magnetic field with a specific magnetic field component which is distributed periodically as a function of a rotational angle about the axis of rotation, with a period length τ.

In the described exemplary embodiment, the Hall voltages outputted by the sensor elements can be represented as follows, with the radial magnetic field component $B_r$ being used as an example for a specific magnetic field component:

$$U_{1,1} = k * B_r(r_{1,1}) * \sin\left(\frac{2\pi}{\tau}\alpha\right) + k * B_{ext,1}$$

$$U_{1,2} = k * B_r(r_{1,2}) * \sin\left(\frac{2\pi}{\tau}\alpha\right) + k * B_{ext,1}$$

$$U_{2,1} = k * B_r(r_{2,1}) * \sin\left(\frac{2\pi}{\tau}(\alpha+\beta)\right) + k * B_{ext,2}$$

$$U_{2,2} = k * B_r(r_{2,2}) * \sin\left(\frac{2\pi}{\tau}(\alpha+\beta)\right) + k * B_{ext,2}$$

where:
$U_{1,1}$: is the Hall voltage of the first sensor element of the first sensor pair;
$U_{1,2}$: is the Hall voltage of the second sensor element of the first sensor pair;
$U_{2,1}$: is the Hall voltage of the first sensor element of the second sensor pair;
$U_{2,2}$: is the Hall voltage of the second sensor element of the second sensor pair;
$B_r(r)$: is the amplitude of the radial magnetic field component that changes periodically with the angle α and which has a value that depends on the radius r;
$r_{1,1}$: is the radial distance of the first sensor element of the first sensor pair from the axis of rotation;
$r_{1,2}$: is the radial distance of the second sensor element of the first sensor pair from the axis of rotation;
$r_{2,1}$: is the radial distance of the first sensor element of the second sensor pair from the axis of rotation;
$r_{2,2}$: is the radial distance of the second sensor element of the second sensor pair from the axis of rotation;
τ: is the period length;
α: is the angle of the magnet relative to the sensor;
β: is the rotational angle between the straight lines associated with the sensor pairs;
$B_{ext,1}$: is the external magnetic field to which the first sensor pair is exposed;
$B_{ext,1}$: is the external magnetic field to which the second sensor pair is exposed;
k: is a proportionality factor.

Here, it is assumed for the described exemplary embodiments that, because of the proximity of the sensor elements of each sensor pair, the external magnetic field is identical for both sensor elements of each pair of sensors. Thus, the differential values $U_1$ and $U_2$ for each sensor pair can be determined from the measured values of the sensor elements, by subtraction:

$$U_1 = U_{1,1} - U_{1,2} = k * (B_r(r_{1,1}) - B_r(r_{1,2})) * \sin\left(\frac{2\pi}{\tau}\alpha\right)$$

$$U_2 = U_{2,1} - U_{2,2} = k * (B_r(r_{2,1}) - B_r(r_{2,2})) * \sin\left(\frac{2\pi}{\tau}(\alpha+\beta)\right)$$

Accordingly, the following equation is resulting for calculating the ratio of the differential values:

$$\frac{U_1}{U_2} = \frac{B_r(r_{1,1}) - B_r(r_{1,2})}{B_r(r_{2,1}) - B_r(r_{2,2})} * \frac{\sin\left(\frac{2\pi}{\tau}\alpha\right)}{\sin\left(\frac{2\pi}{\tau}(\alpha+\beta)\right)}.$$

It has to be considered, here, that $B_r(r)$ designates the amplitude of the magnetic field component, which is independent of the angle α. Therefore, in a particularly preferred embodiment, the factor $$\frac{B_r(r_{1,1}) - B_r(r_{1,2})}{B_r(r_{2,1}) - B_r(r_{2,2})} = 1$$

can be set. For example, in an embodiment in which all the sensor elements are arranged within a radius section in which the component of the magnetic field strength increases linearly, this can be the case if the radial distance between the sensor elements is the same for both sensor pairs. Also, this can be precisely the case if the radial distance of the first sensor elements of the two pairs and of the second sensor elements of the two pairs to the axis of rotation is identical. This can also be a reasonable approximation for slight deviations from the described embodiments. Accordingly, in the particularly preferred embodiment, the angle α can be determined by the equation $$\frac{U_1}{U_2} = \frac{\sin\left(\frac{2\pi}{\tau}\alpha\right)}{\sin\left(\frac{2\pi}{\tau}(\alpha+\beta)\right)}.$$

For example, the sensor assembly according to the invention may comprise a computing unit which is capable of numerically determining the angle α from the ratio $$\frac{U_1}{U_2}$$

obtained as described above from the measured values of the sensor elements based on the equation presented, for example by way of appropriate tables. It has to be considered, here, that the angle β and the period length τ are known, on the basis of the geometry of the sensor assembly according to the invention. Particularly preferably, the angle β may be predefined to be $$\frac{\tau}{4},$$

so that the ratio can be simplified to give $$\frac{U_1}{U_2} = \frac{\sin\left(\frac{2\pi}{\tau}\alpha\right)}{\sin\left(\frac{2\pi}{\tau}\alpha + \frac{\pi}{2}\right)} = \tan\left(\frac{2\pi}{\tau}\alpha\right),$$

so that the angle α can also be obtained analytically from the measured and determined ratio $$\frac{U_1}{U_2}$$

by simply calculating arc tangent.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention will be explained in more detail below with reference to FIGS. 1a-1d, 2a-2b, and 3a-3b, where.

DETAILED DESCRIPTION OF THE INVENTION

FIGS. 1a-1d schematically illustrate an embodiment of a sensor assembly according to the invention by way of schematic views and graphs of the distribution of the magnetic field.

Figure 1A:
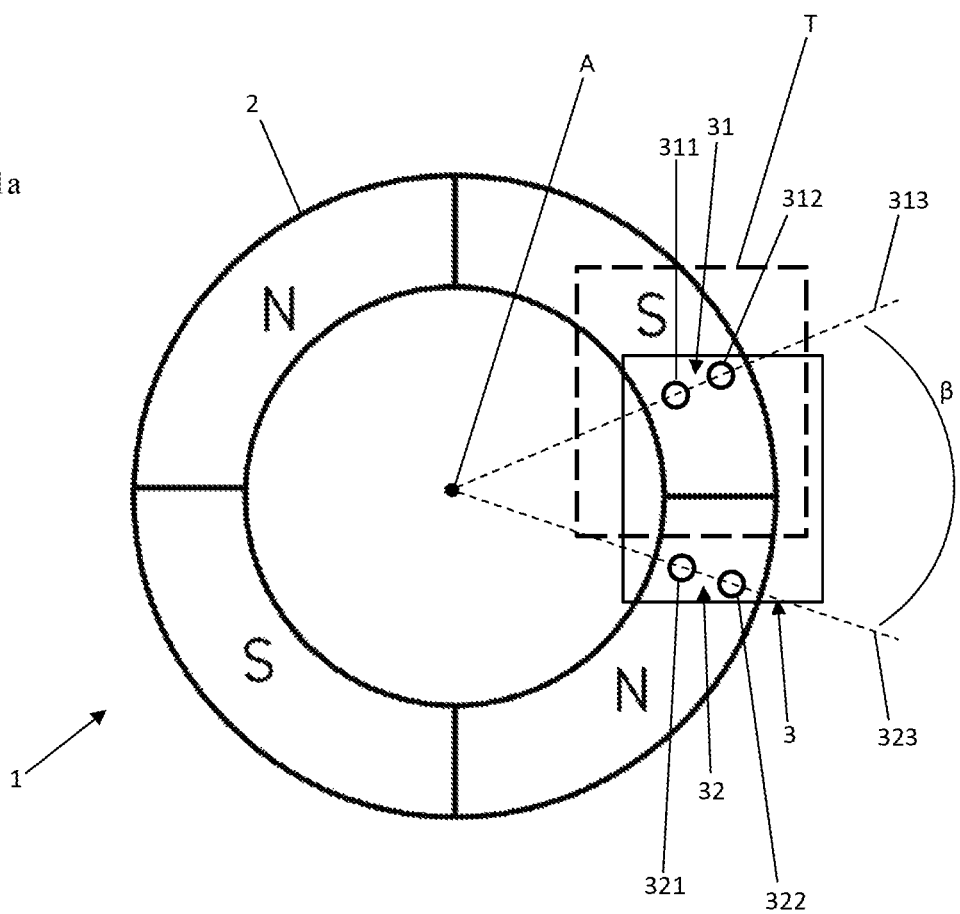
FIGS. 1a, 1b, 1c, and 1d include schematic views illustrating an embodiment of a sensor assembly according to the invention.
Figure 1B:
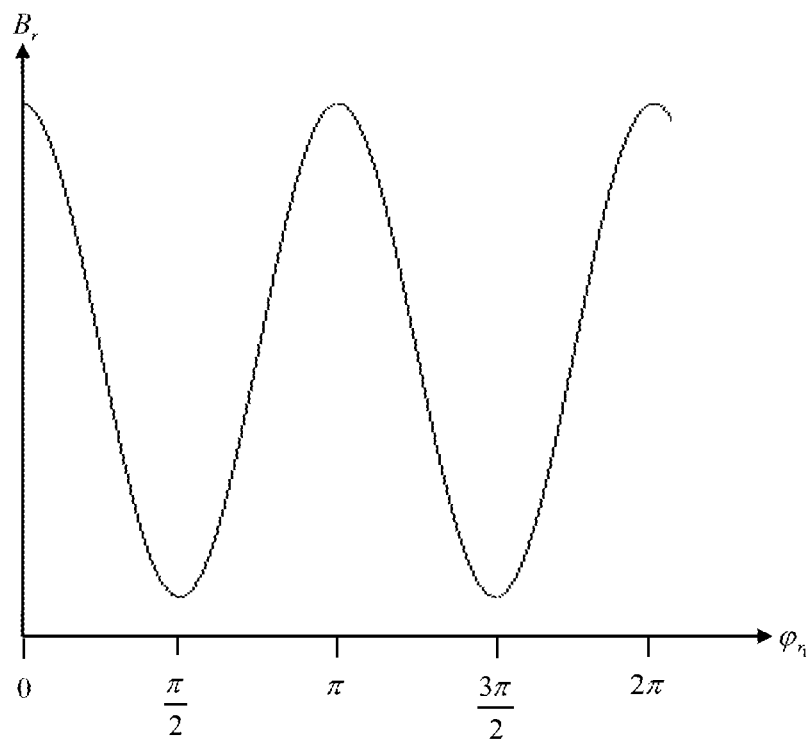
Figure 1C:
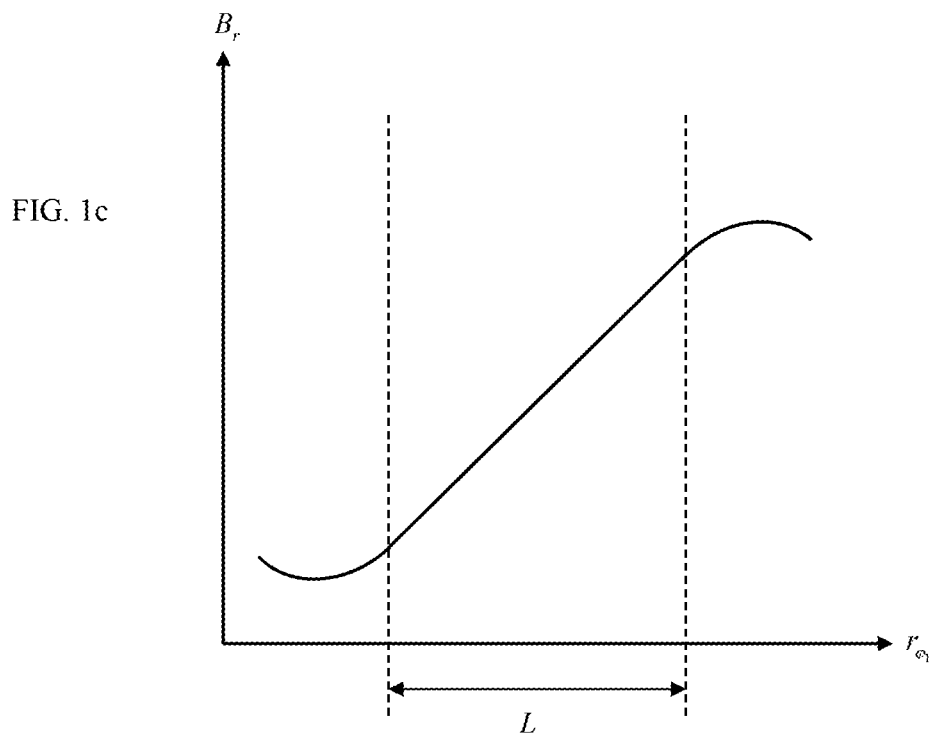
Figure 1D:
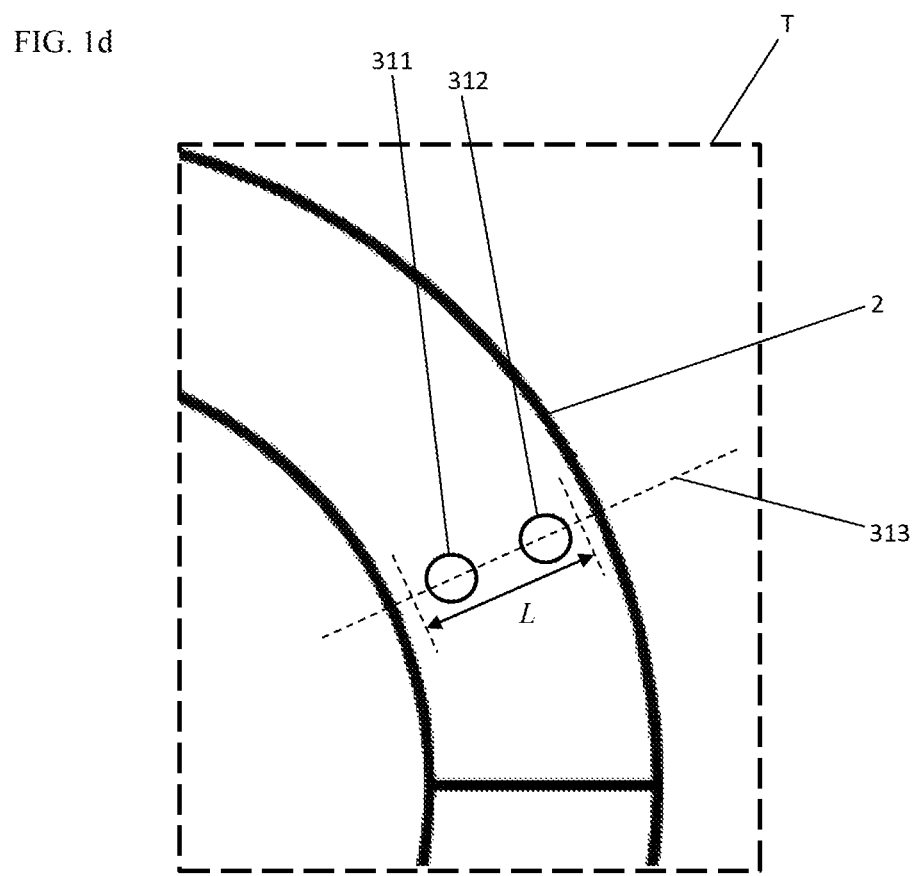

FIG. 1a illustrates the present embodiment with a view along the axis of rotation A, which in the present case extends centrally through the magnet 2, perpendicular to the drawing plane. The described embodiment comprises a magnet 2 and a sensor 3. Magnet 2 is configured as a multi-pole, in the present case four-pole, ring magnet with axial-lateral magnetization. Thus, the magnet 2 has four poles on its end face which is shown in FIG. 1a and which limits the extension thereof in the direction along the axis of rotation A. Each pole extends over an angular range of 90°. The poles are arranged alternately, so that the magnet 2 is configured so as to provide a magnetic field with a magnetic field strength which is distributed periodically, with a period length τ, as a function of a rotational angle about the axis of rotation A. Due to the symmetry of magnet 2 with its four poles, the period length τ corresponds to an angle of π. The periodicity is related to the radial magnetic field component of magnet 2 here. The periodicity of this radial magnetic field component $B_r$ is plotted in FIG. 1b as a function of the rotational angle φ. FIG. 1b shows the distribution of the magnetic field strength in the radial direction, $B_r$, as a function of the angle φ at a radius $r_1$. It has to be considered, here, that the amplitude of $B_r$ depends on the radius r. This dependency is illustrated in FIG. 1c. FIG. 1c shows the radial magnetic field component $B_r$ as a function of the radius r at a specific angle $\varphi_1$. As can be seen from FIG. 1c, the radial magnetic field component $B_r$ changes linearly over a section L of the radius. Radius section L is also indicated geometrically in FIG. 1d which shows a section T of the view of FIG. 1a in an enlarged scale.

The sensor 3 of the embodiment illustrated in FIGS. 1a-1d include two sensor pairs 31, 32. Each sensor pair A has associated therewith a straight line 313, 323, which intersects the axis of rotation A and extends perpendicular to the axis of rotation A. The first sensor pair 31 includes a first sensor element 311 and a second sensor element 312, both of which are arranged along straight line 313 that is associated with the first sensor pair 31. The second sensor pair 32 includes a first sensor element 321 and a second sensor element 322, both of which are arranged along straight line 323 that is associated with the second sensor pair 32. The two straight lines 313, 323 associated with the sensor pairs 31, 32 are spaced apart by a rotational angle β. As can be seen in particular from FIG. 1d, all the sensor elements 311, 312, 321, 322 are arranged within the radius section of magnet 2 in which the radial magnetic field component changes linearly, as illustrated in FIG. 1c. The radial spacing of the sensor elements of each sensor pair is less than 70% of the radial extent of the radius section L. In the described embodiment, the radial distance of the first sensor element 311 of the first sensor pair 31 from the axis of rotation A is identical to the radial distance of the first sensor element 321 of the second sensor pair 32 from the axis of rotation A, and the radial distance of the second sensor element 312 of the first sensor pair 31 from the axis of rotation A is identical to the radial distance of the second sensor element 322 of the second sensor pair 32 from the axis of rotation A. Accordingly, the determination of the angle α of magnet 2 relative to sensor 3 as described above is possible in the illustrated embodiment. Due to the geometrical arrangement of the sensor assembly 1 as illustrated in FIG. 1a, the factor $$\frac{B_r(r_{1,1}) - B_r(r_{1,2})}{B_r(r_{2,1}) - B_r(r_{2,2})} = 1$$

is identical to 1, since due to the identical radial distances of the first sensor elements 311, 321 and the second sensor elements 312, 322 the following applies: $B_r(r_{1,1})-B_r(r_{1,2})$ $=B_r(r_{2,1})-B_r(r_{2,2})$. As a result, the determination of the angle α is particularly simplified.

Figure 2A:
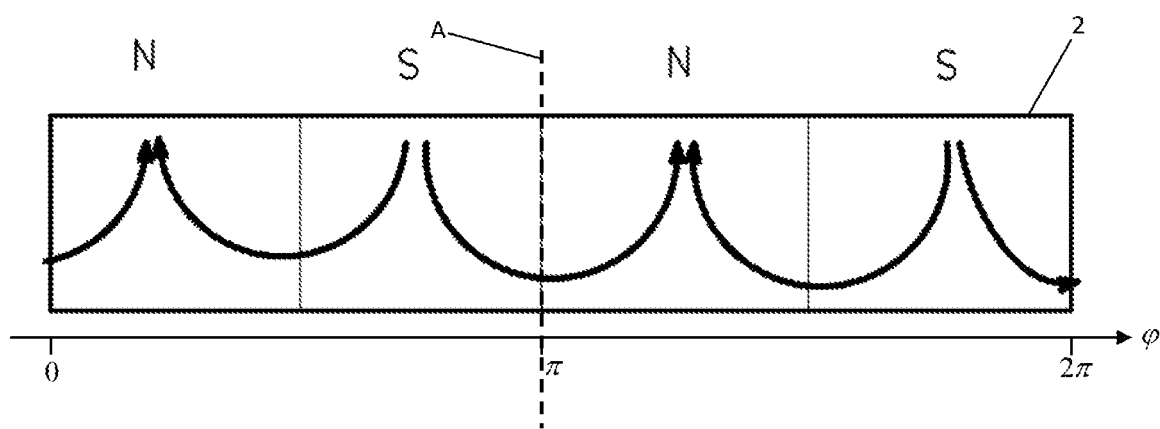
FIGS. 2a and 2b schematically illustrate variants of magnetization of a magnet employed in an embodiment according to the invention.
Figure 2B:
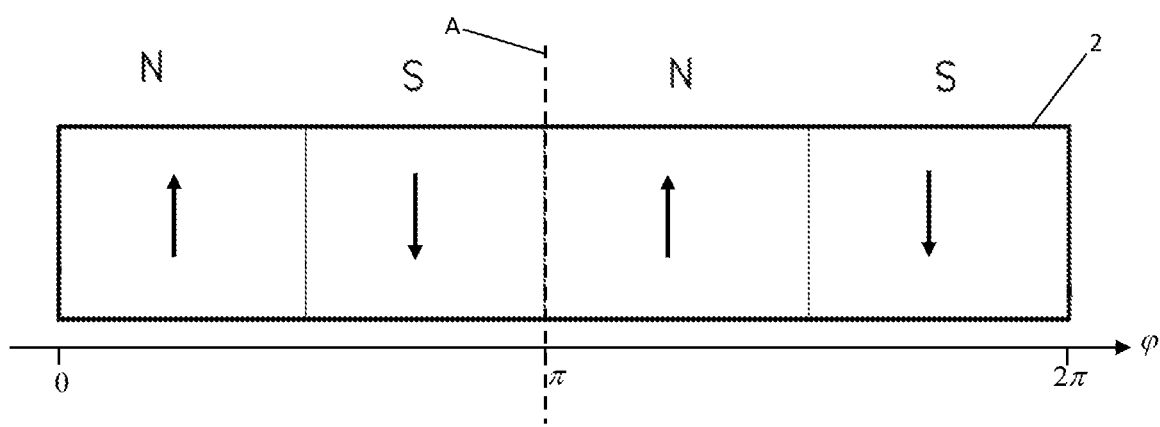

FIGS. 2a and 2b illustrate different variants of magnetization of a magnet 2 which can be employed in a sensor assembly 1 of the invention according to FIGS. 1a-1d. FIGS. 2a and 2b each illustrate a respective magnet 2 according to FIG. 1a in a "developed" view, with the axis of rotation A also being shown in FIGS. 2a and 2b, as in FIG. 1a, for the sake of explanation. FIG. 2a illustrates a magnet 2 with axial-lateral magnetization. This magnet 2 has four magnetic sections, each one defining a pole and being in the form of an angular section of the ring magnet. The orientation of the magnetization vector varies within each magnetic section, with the magnetization of magnet 2 exhibiting an arcuate distribution. Arcuate distribution herein refers to the fact that the magnetization within magnet 2 extends according to an arcuate pattern from one magnetic section in the form of an angular section having a specific polarity to the magnetic section in the form of an angular section adjacent thereto and having an opposite polarity, wherein at the transition between the magnetic sections the magnetization has an orientation perpendicular to the axis of rotation A. The magnet 2 with axial-lateral magnetization as shown in FIG. 2a is particularly well suited for providing a magnetic field which has a periodicity in dependence of the rotational angle and free of harmonics, so that the exemplary calculation described above with respect to the calculation option in the case of a harmonic-free periodicity can be applied. Moreover, when using a magnet 2 as illustrated in FIG. 2a it is possible to provide a magnetic field in which a magnetic field component, in particular the radial magnetic field component, changes monotonically, in particular linearly, in a sufficiently large section of the radius, which allows for the further simplified calculation of the angle α as explained in conjunction with FIG. 1a. FIG. 2b, on the other hand, illustrates a magnet 2 with purely axial magnetization. This magnet 2 can also be used as the magnet 2 of the sensor assembly 1 illustrated in FIG. 1a and has a similarly alternating arrangement of its four poles. However, the magnetization within the magnet 2 of FIG. 2b extends exclusively in a direction along the axis of rotation A, so that within the magnet 2 there is no arcuate orientation of the magnetization as in the case of the magnet 2 of FIG. 2a with axial-lateral magnetization. As a result, a field distribution without harmonics will not be generated at any sensor distance from the end face, but only at increased sensor distances.

Figure 3A:
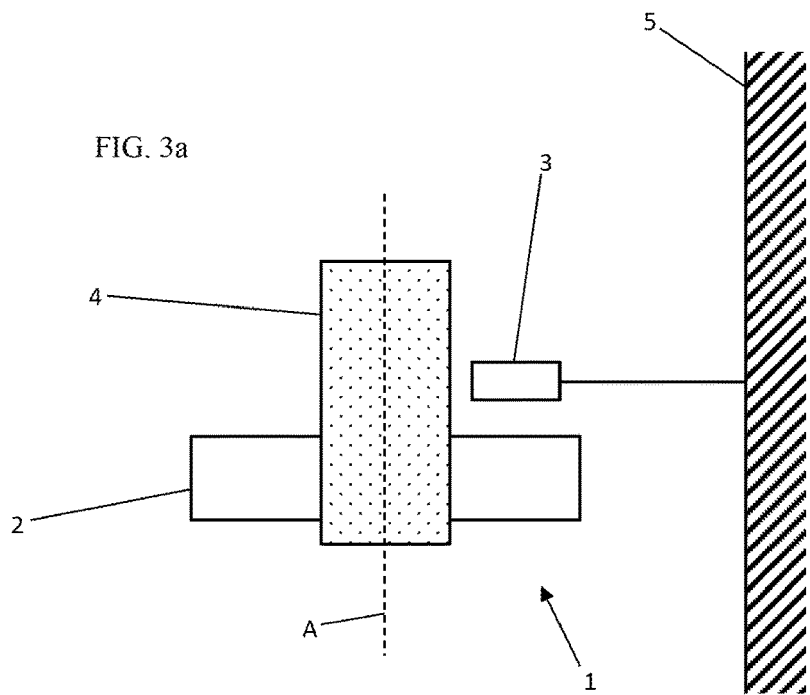
FIGS. 3a and 3b are schematic views illustrating further embodiments of a sensor assembly according to the invention.
Figure 3B:
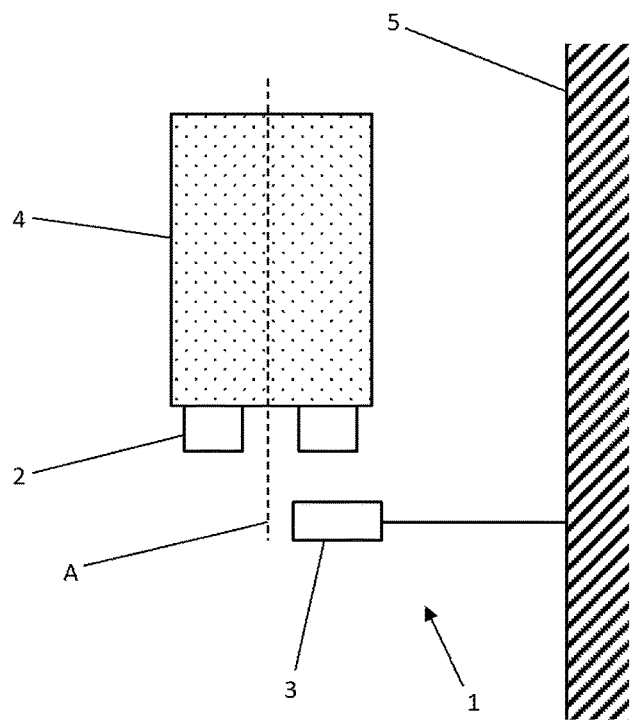

FIGS. 3a and 3b, illustrate two further exemplary embodiments of a sensor assembly 1 according to the invention by way of illustrative schematic views. These exemplary embodiments each comprise a rotor 4 and a stator 5. In both exemplary embodiments, the magnet 2 is fastened to the rotor 4 in twist-protected manner, and the sensor 3 is fastened to the stator 5 in twist-protected manner. Magnet 2 and sensor 3 of the embodiments according to FIGS. 3a and 3b can be configured and arranged relative to each other similarly to the exemplary embodiment according to FIG. 1a. The versatile applicability of the sensor assembly 1 according to the invention will easily be apparent for a person skilled in the art from FIGS. 3a and 3b and the exemplary embodiments illustrated there. In the exemplary embodiment according to FIG. 3a, magnet 2 is arranged on the radial outer surface of rotor 4, and sensor 3 is arranged at a location along the axis of rotation A above magnet 2 and radially outside of rotor 4 and is fixed to stator 5. In the embodiment according to FIG. 3b, magnet 2 and sensor 3 are arranged at the end face side of rotor 4 and therefore within the radial extent of the rotor. For this purpose, the magnet 2 is mounted to the end face of rotor 4, while the sensor 3 is arranged at a location along the axis of rotation A below magnet 2 and within the radial extent of rotor 4 and is fastened to the stator 5. In further exemplary embodiments, the sensor 3 may as well be arranged radially offset from the magnet 2. The arrangement of sensor 3 and magnet 2 relative to each other can be selectively chosen depending on the embodiment, in particular depending on the distribution of the magnetic field of the magnet 2 of the embodiment. As will be apparent to a person skilled in the art, the versatile applicability of the sensor assembly 1 according to the invention results in particular from the fact that it is sufficient to arrange the sensor 3 only along a small radial section of the magnet 2. At the same time and in a simple manner, the sensor assembly 1 of the invention ensures a reliable elimination of the influence of an external magnetic field as well as a precise determination of an angular position of a rotor 4 relative to a stator 5 with respect to a rotation about an axis of rotation A.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE NUMERALS

1 Sensor assembly
2 Magnet
3 Sensor
4 Rotor
5 Stator
31 First sensor pair
32 Second sensor pair
311 First sensor element
312 Second sensor element
313 Straight line associated with first sensor pair
321 First sensor element
322 Second sensor element
323 Straight line associated with second sensor pair
A Axis of rotation
L Radius Section
T Section
β Rotational angle

The invention claimed is:

1. A sensor assembly (1) for determining an angular position of a rotor (4) relative to a stator (5), comprising two components, namely a magnet (2) and a sensor (3),
   wherein said components (2, 3) are arranged for rotation relative to each other about an axis of rotation (A),
   wherein the sensor (3) comprises a first and a second sensor pair (31, 32), each one having a first sensor element and a second sensor element (311, 312, 321, 322), each one of the sensor elements (311, 312, 321, 322) being configured for determining a magnetic field strength to which it is exposed;
   wherein each sensor pair (31, 32) has a straight line (313, 323) associated therewith, along which the two sensor elements (311, 312, 321, 322) lie and which intersects with the axis of rotation (A),
   wherein the first sensor element (311, 321) has a smaller radial distance from the axis of rotation (A) than the second sensor element (312, 322),
   wherein both sensor elements (311, 312, 321, 322) lie on the same radial side of the axis of rotation (A), and
   wherein the straight line (313) associated with the first sensor pair (31) is spaced apart from the straight line (323) associated with the second sensor pair (32) by a rotational angle (β) about the axis of rotation (A),
   the sensor assembly (1) further comprising a computing unit for determining the angular position of the rotor (4) relative to the stator (5), wherein the computing unit is configured to determine measured values from the sensor elements (311, 312, 321, 322), which measured values are proportional to a magnetic field prevailing at the respective sensor element (311, 312, 321, 322),
   wherein, for eliminating an interfering influence of an external interfering magnetic field, the computing unit is configured to determine a first differential value by subtracting a measured value determined from the first sensor element (311) of the first sensor pair (31) from a measured value determined from the second sensor element (312) of the first sensor pair (31), and to determine a second differential value by subtracting a measured value determined from the first sensor element (321) of the second sensor pair (32) from a measured value determined from the second sensor element (322) of the second sensor pair (32), and to determine the angular position of the rotor (4) relative to the stator (5) from the ratio of said differential values.

2. The sensor assembly (1) as claimed in claim 1, wherein the radial distance between the two sensor elements (321, 322) of the first sensor pair (31) corresponds to the radial distance between the two sensor elements (311, 312) of the second sensor pair (32).

3. The sensor assembly (1) as claimed in claim 1, wherein the first sensor element (311) of the first sensor pair (31) has the same radial distance from the axis of rotation (A) as the first sensor element (321) of the second sensor pair (32); and/or wherein the second sensor element (312) of the first sensor pair (31) has the same radial distance from the axis of rotation (A) as the second sensor element (322) of the second sensor pair (32).

4. The sensor assembly (1) as claimed in claim 1, wherein the magnet (2) is configured as a multi-pole magnet (2) with at least two, in particular at least four poles, for providing a magnetic field with a magnetic field strength that is distributed periodically about the axis of rotation (A) as a function of a rotational angle, with a period length τ.

5. The sensor assembly (1) as claimed in claim 4, wherein the rotational angle (β) about which the straight lines (313, 323) of the two sensor pairs (31, 32) are spaced apart from each other is $$\frac{\pi}{N},$$

wherein N is the number of poles of the magnet (2).

6. The sensor assembly (1) as claimed in claim 1, wherein the magnet (2) is configured so that a magnetic field component of a specific direction of a magnetic field generated by the magnet (2) changes monotonically, in particular linearly, within a radius section, wherein the sensor elements (311, 312, 321, 322) of the sensor (3) are arranged within said radius section.

7. The sensor assembly (1) as claimed in claim 1, wherein at least one of the sensor pairs (31, 32) comprises at least three of the sensor elements (311, 312, 321, 322), each one lying along the straight line (313, 323) associated with the sensor pair (31, 32); and/or wherein the sensor (3) comprises at least three sensor pairs (31, 32) each one having a respective straight line (313, 323) associated therewith along which the sensor elements (311, 312, 321, 322) of the respective sensor pair (31, 32) are arranged, wherein all the straight lines (313, 323) are spaced apart from each other by a rotational angle about the axis of rotation (A) and intersect in the axis of rotation (A).

8. The sensor assembly (1) as claimed in claim 1, wherein the sensor elements (311, 312, 321, 322) are configured as Hall sensor elements outputting a Hall voltage as a measured value.

9. The sensor assembly (1) as claimed in claim 1, wherein the measured values are proportional to a field component of the magnetic field perpendicular to the axis of rotation (A), in particular proportional to a radial field component of the magnetic field.

10. The sensor assembly (1) as claimed in claim 1, wherein the computing unit is configured to determine the angular position based on an angle α, and to determine the angle α using the equation $$\frac{U_1}{U_2} = \frac{f\left(\frac{2\pi}{\tau} * \alpha\right)}{f\left(\frac{2\pi}{\tau} * (\alpha + \beta)\right)},$$

wherein $U_1$ is the first differential value, $U_2$ is the second differential value, τ is the period length, $f(\alpha)$ is a periodic function depending on α with the period length τ, and β is the rotational angle between the straight lines (313, 323) associated with the two sensor pairs (31, 32).

11. The sensor assembly (1) as claimed in claim 1, further comprising the stator (5) and the rotor (4),
   wherein one of the two components (2, 3) is arranged on the rotor (4) and the other one is arranged on the stator (5).

12. Use of a sensor assembly (1) as claimed in claim 1 for determining the angular position of the rotor (4) relative to the stator (5), wherein measured values are derived from the sensor elements (311, 312, 321, 322) of the sensor pairs (31, 32), wherein for eliminating an interfering influence of an external interfering magnetic field, a first differential value is determined by subtracting a measured value determined from the first sensor element (311) of the first sensor pair (31) from a measured value determined from the second sensor element (312) of the first sensor pair (31), and a second differential value is determined by subtracting a measured value determined from the first sensor element (321) of the second sensor pair (32) from a measured value determined from the second sensor element (322) of the second sensor pair (32), and the angular position is determined from the ratio of the two differential values.

13. A method for determining an angular position of a rotor (4) relative to a stator (5) using a sensor assembly (1) that comprises two components, namely a magnet (2) and a sensor (3), one of the two components (2, 3) being arranged on the rotor (4) and the other one on the stator (5), wherein the sensor (3) comprises a first and a second sensor pair (31, 32), each one comprising two sensor elements (311, 312, 321, 322), wherein each sensor pair (31, 32) has a straight line (313, 323) associated therewith, along which the two sensor elements (311, 312, 321, 322) lie and which intersects with the axis of rotation (A), wherein the first sensor element (311, 321) has a smaller radial distance from the axis of rotation (A) than the second sensor element (312, 322), wherein both sensor elements (311, 312, 321, 322) lie on the same radial side of the axis of rotation (A), and wherein the straight line (313) associated with the first sensor pair (31) is spaced apart from the straight line (323) associated with the second sensor pair (32) by a rotational angle (β) about the axis of rotation (A), such that the sensor pairs (31, 32) are spaced apart from each other by a rotational angle (β) about an axis of rotation (A) about which the rotor (4) is rotatable relative to the stator (5), wherein measured values are determined from the sensor elements (311, 312, 321, 322), each measured value being proportional to a magnetic field prevailing at the respective sensor element (311, 312, 321, 322), wherein, for eliminating an interfering influence of an external interfering magnetic field, a first differential value is determined by subtracting a measured value determined from the first sensor element (311) of the first sensor pair (31) from a measured value determined from the second sensor element (312) of the first sensor pair (31), and a second differential value is determined by subtracting a measured value determined from the first sensor element (321) of the second sensor pair (32) from a measured value determined from the second sensor element (322) of the second sensor pair (32), and wherein the angular position is determined from the ratio of the two differential values.

* * * * *